Figure 1:
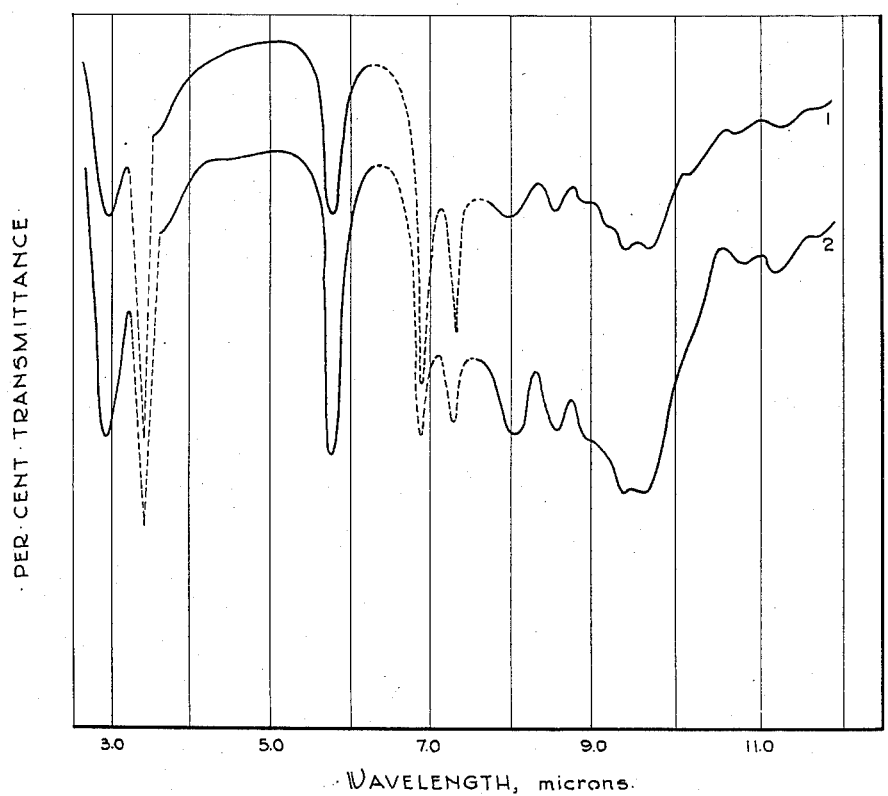

Jan. 4, 1955             R. H. HASKINS             2,698,843

USTILAGIC ACID AND METHOD OF PREPARING THE SAME

Filed March 18, 1952             2 Sheets-Sheet 1

INVENTOR.
Reginald H. Haskins
BY
Attorney.

2,698,843

USTILAGIC ACID AND METHOD OF PREPARING THE SAME

Reginald H. Haskins, Saskatoon, Saskatchewan, Canada, assignor to National Research Council, Ottawa, Ontario, Canada, a body corporate of Canada Application March 18, 1952, Serial No. 277,177

6 Claims. (Cl. 260—210)

This invention relates to a new metabolic composition of matter comprising essentially ustilagic acid and its preparation.

During the past few years a number of metabolic products of the growth of bacteria and fungi have been isolated and found to possess valuable therapeutic and chemical properties. Among these are the now well-known antibiotic substances such as penicillin, streptomycin, aureomycin, etc. Some have proven valuable because of their effectiveness against pathogenic organisms, others as starting points in the chemical syntheses of desired compounds such as ergosterol in the production of cortisone. Most of the antibiotics are of limited use because of their toxicity, the narrow range of their activity and their high cost.

Certain of the previously described antibiotics are mainly effective against Gram-positive organisms, others against Gram-negative organisms, whereas the very few of those which show appreciable activity against fungi are toxic to animals.

Inasmuch as many fungi are of importance as plant pathogens, as human pathogens, and as destroyers of foodstuffs and material, it is highly desirable that inexpensive antibiotics be discovered that are in themselves effective against fungi. It is, therefore, one of the objects of the present invention to provide a new metabolic composition which has antibiotic properties against many fungi as well as against certain bacteria and which is non toxic to animals. Not only is the new product antibiotically active against fungi and bacteria, but it is useful as a starting point in the syntheses of organic compounds.

A further object of the invention is to provide an easy and comparatively inexpensive method of preparing the new product from the organism *Ustilago zeae*. The invention provides commercial yields of ustilagic acid which is produced inexpensively in large quantities from readily available materials.

As noted above, the new composition has been found in vitro studies to be effective against certain bacteria of different types and against a wide range of fungi. Among the Gram-negative organisms which fail to propagate in its presence may be mentioned the plant disease organisms *Xanthomonas campestric* and *Xanthomonas translucens cerealis* as well as the pathogen *Brucella bronchiseptica*. Among the Gram-positive organisms whose growth is inhibited in vitro by it are *Bacillus subtilis*, *Corynebacterium flaccumfaciens*, *Micrococcus pyogenes* var. *aureus* and *Mycobacterium smegmatis*. Other bacteria including pathogens are also affected by it in varying degrees.

Among the fungi which are inhibited in vitro by it are the plant pathogens *Thielaviopsis basicola*, *Ascochyta* sp., *Claviceps purpurea*, *Rhizoctonia solani*, *Helminthosporium sativum* and a number of others. Fungi found in the soil and often found degrading foodstuffs and other material such as *Streptomyces* spp., *Neurospora sitophila*, *Chaetomium* sp., *Pleospora* sp., *Aspergillus* spp., *Aspergillus niger*, *Gliocladium* sp., etc. are inhibited in vitro by its presence. Pathogens such as *Cryptococcus neoformans* and *Candida albicans* are also inhibited in vitro by it. Other pathogenic fungi are also affected by it in varying degrees.

The new product contains carboxylic acid functional groups and forms salts with bases but is rapidly degraded by alkali. Recrystallization from neutral solutions does not alter the antibiotic properties of the material. Heating it up to at least an hour at temperatures less than 100° C. does not alter materially its antibiotic properties. It is non toxic when administered orally to rats over a period of weeks in amounts up to at least 5% of the diet, with chicks orally up to at least 2½% of the diet and with mice orally up to at least 1% of the diet or intraperitoneally in amounts up to 1.5 gms. per kgm. of body weight.

The new composition may appear in the culture mixture as long needle-like crystals having a melting point of 146–7° C. and a specific rotation in pyridine of $[\alpha]_D^{23} + 7°$.

The composition is very soluble in methanol, pyridine, 2,3-butanediol and 1,2-propanediol, soluble in ethanol, sparingly soluble in blood serum, vegetable oils, butanol, and acetone and insoluble in water, gylcerol, ethyl acetate, amyl acetate, diethyl ether, benzene and petroleum ether. Solubility in water is limited to a maximum of between 40 and 50 $\gamma$ per ml. These remarkable solubility properties indicate that the substance is moderately polar in chemical nature and make it possible to readily separate the product from other solids in the culture medium in which it is produced.

It contains 56.5–56.8% carbon, 8.2–8.5% hydrogen and the balance oxygen. Its molecular weight is 760±20. Titration of its free acidity gave an average neutralization equivalent of 780. The purified product has a melting point of 146–147° C. It exhibits characteristic absorption bands, in the infra red region of the spectrum when suspended in a hydrocarbon oil in solid form at the following wave lengths expressed in microns, of 2.98, 5.76, 8.04, 8.54, 8.88, 9.38, 9.68, 10.18, 10.72, 11.22 and 11.76. The absorption at 2.98 microns is due to hydroxyl and at 5.76 to carbonyl. The infra red absorption spectrum is shown in the accompanying drawing Figure 1.

The organism used to produce the new product was isolated from an ear of corn (maize) heavily infected with the corn smut fungus, *Ustilago zeae*, and collected near Hawarden, Saskatchewan. Cultures of this living organism have been deposited with the Canadian Collection of Microorganisms, National Research Council, Ottawa, Canada, under the number P. R. L. 119 and with the Northern Regional Research Laboratory, Peoria, Illinois, U. S. A., under the number NRRL 2321, and with the American Type Culture Collection under the number ATC 11,427.

The organism grows slowly but well on many types of nutrient agars. Particularly good growth with few mutants occurs on mineral-urea-glucose agar. The tendency to form sectors and mycelial-type of growth is greater when potato dextrose agar is used than with mineral-urea-glucose agar. Growth is generally an olivaceous yellow on nutrient agars with dark brown sectors appearing frequently on potato dextrose agar.

In shake-flask culture in a mineral-urea-glucose medium, the culture mixture soon becomes creamy in both colour and consistency due to the presence of yeast-like budding cells of the smut and its metabolic products. The colour of the culture mixture darkens with increasing age and continued aeration.

Structurally and functionally the organism as found naturally and as represented by spontaneous or induced mutants belongs to the genus currently distinguished as Ustilago and is the well known plant disease fungus *Ustilago zeae*.

To produce the new product a culture of the fungus, *Ustilago zeae*, is grown aerobically, preferably in deep tank culture, in a suitable nutrient medium under conditions of time, temperature, pH, aeration, mixing, etc. as will be hereinafter described. The nutrient medium contains, in common with media in which other fungi are grown for the production of antibiotic and other substances, a source of carbon such as a soluble carbohydrate; a source of nitrogen, organic or inorganic, certain mineral salts such as phosphates and traces of various metals which are usually found as impurities in the other substituents of the medium or present in such materials as corn steep liquor added to the medium.

As a carbon source, there may be used sugars such as glucose, maltose, dextrose, fructose, sucrose or the like. The amount of such carbon sources in the medium for best production of the new product may vary considerably from 5 to 15% of the total weight of the fermentation medium.

Suitable sources of nitrogen for the fermentation process include a wide variety of substances, in particular $KNO_3$, $(NH_4)_2SO_4$, $NH_4Cl$, $NH_4NO_3$, urea, yeast extract, fish solubles, distillers' solubles, corn steep liquor and the like. Corn steep liquor because of the wide variety of substances contained therein, both organic and inorganic, has been found to be a valuable addition to the fermentation media. It is not possible of course because of the crude nature of many of these nitrogenous substances to specify definite proportions of the material to be added. Amounts of 0.12% urea and 0.06% by weight corn steep liquor where the medium contains 10% glucose seem to be optimal with materials used in this laboratory.

In common with most fermentation processes, the process of the present invention is conducted with a liquid medium containing certain inorganic salts such as phosphates. Among elements which are desirable in small amounts are potassium, calcium, magnesium, sulphur, iron and certain elements in traces. When using crude substances as a source of nitrogen or carbon, however, such as corn steep liquor and tap water (in certain areas) many of these elements are contained therein and need not be added to the medium.

The pH of the fermentation medium should preferably be on the acid side, around pH 6 to pH 7 at the start of the fermentation; however, with the media described hereinbelow no special adjustment of starting pH is necessary. As the fermentation progresses the pH of the medium rapidly declines to inhibitory levels unless an insoluble buffer such as $CaCO_3$ has been added to the medium in quantities sufficient to provide a pH of 4–4.5 at the end of the fermentation or the pH is controlled by other means during the progress of the fermentation. Calcium carbonate in amount of 1.7 gms. per litre medium has proved satisfactory in this respect.

The fermentation may be carried out at about 24 to 34° C. Lower temperatures may be used with corresponding increase in fermentation time. Higher temperatures may be used with less satisfactory results. Maximum yields have been obtained in 40–46 hours of fermentation at optimum conditions of temperature, mixing and aeration, but lower yields are obtained in shorter periods of time and a longer period is desirable under some conditions.

To isolate the organism for use in the process small portions of the heavily infected host plant containing mature spores are shaken or gently streaked over the surface of sterile plates of a suitable nutrient agar such as the commonly used potato dextrose agar. Spores collected from infected plants may be conveniently shaken or sprayed onto the surface of such agar plates. After several days incubation at about 25–30° C. individual colonies of the fungus are of a size permitting effective separation of pure colonies from unwanted contaminating organisms which even at this stage may show inhibition caused by products diffusing from the growing smut colonies. The pure colonies are streaked on fresh agar plates and when the absence of all contaminating organisms has been assured the isolated organism is transferred to other growth media for further propagation and subsequently used to inoculate large scale volumes of fermentation media for commercial production of the new metabolic product.

Small scale fermentation, for laboratory investigation or for the production of inocula for larger fermentation, is conducted in shaker flasks open to the air but protected from contamination with cotton plugs. As a typical case 100 millilitres of a culture medium composed of 10% by weight glucose, 0.12% urea, 0.06% corn steep liquor, 0.17% $CaCO_3$ and a mineral base containing 0.03% $K_2HPO_4$, 0.02% $KH_2PO_4$, 0.02% $MgSO_4.7H_2O$, 0.01% NaCl, 0.01% $CaCl_2.2H_2O$, 0.0015% $FeSO_4.7H_2O$, 0.000025% $ZnCl_2$ are introduced into 500 millilitre erlenmeyer flasks and sterilized. The mineral base used may be simplified to contain 0.1% $KH_2PO_4$, 0.04% $MgSO_4.7H_2O$, 0.003% $FeSO_4.7H_2O$ with almost equally satisfactory results since adequate trace elements are present in the other components of the medium.

After autoclaving, the medium having a pH between 6.2 and 6.8 is inoculated with a small quantity, about 1% by volume, of a turbid aqueous mycelial suspension from an agar plate culture. The contents of the flask are then incubated at 30° C. for two to three days or until the available carbohydrate has been utilized by the growing organism, while shaking on a rotary shaker with a one-inch radius of motion operating at 225 R. P. M. After the incubation period, the fermented mixture contains about 2 gms. of the new product.

For larger scale production of ustilagic acid, a fermentation medium containing by weight 5% glucose, 0.06% urea, 0.06% corn steep liquor, 0.1% $KH_2PO_4$, 0.04% $MgSO_4.7H_2O$, 0.003% $FeSO_4.7H_2O$, 0.17% $CaCO_3$ is made up to volume of 100 gallons with tap water and introduced into a 200 gallon stainless steel fermentor which has been presterilized with steam. The medium is treated with steam for the minimum time and pressure to ensure sterilization. The pH of the medium after sterilization is between 6.8 and 6.2 and during a normal fermentation the pH drops to about 4.6–4.3.

The above tank medium may be inoculated with vegetative cells of the fungus produced either in shaker flasks or in 5 gallon stainless steel fermentors. The inoculum may be added in an amount equal to 1 to 5% by volume of the liquid in the tank. It will be understood, of course, that the inoculations are made aseptically. The fermentation is conducted with mixing and submerged aseptic aeration of the culture mixture. The rate of aeration may vary considerably and will depend in part upon the kind of agitation or mixer used and the rate at which it is operated. A rate of air flow from about 0.2 to 1.0 litres of air per litre of mash per minute can be used, the preferred rate of aeration being from about 0.25 to 0.5 litre of air per litre of mash per minute. Excessive foaming of the fermentation medium may be controlled by the addition of antifoaming agents such as silicone at the start of the fermentation or small amounts of sterile antifoam agents such as lard oil added aseptically in small amounts as needed. Control of excessive foaming by mechanical beaters is successful and is preferred.

Fermentation is conducted preferably at 28° to 30° C. with a positive pressure in the tank to reduce the danger of contamination. When all of the available carbohydrate has been utilized the fermentation mixture is cooled, withdrawn, filtered or centrifuged and the solids treated to recover the new metabolic product.

Figure 2:
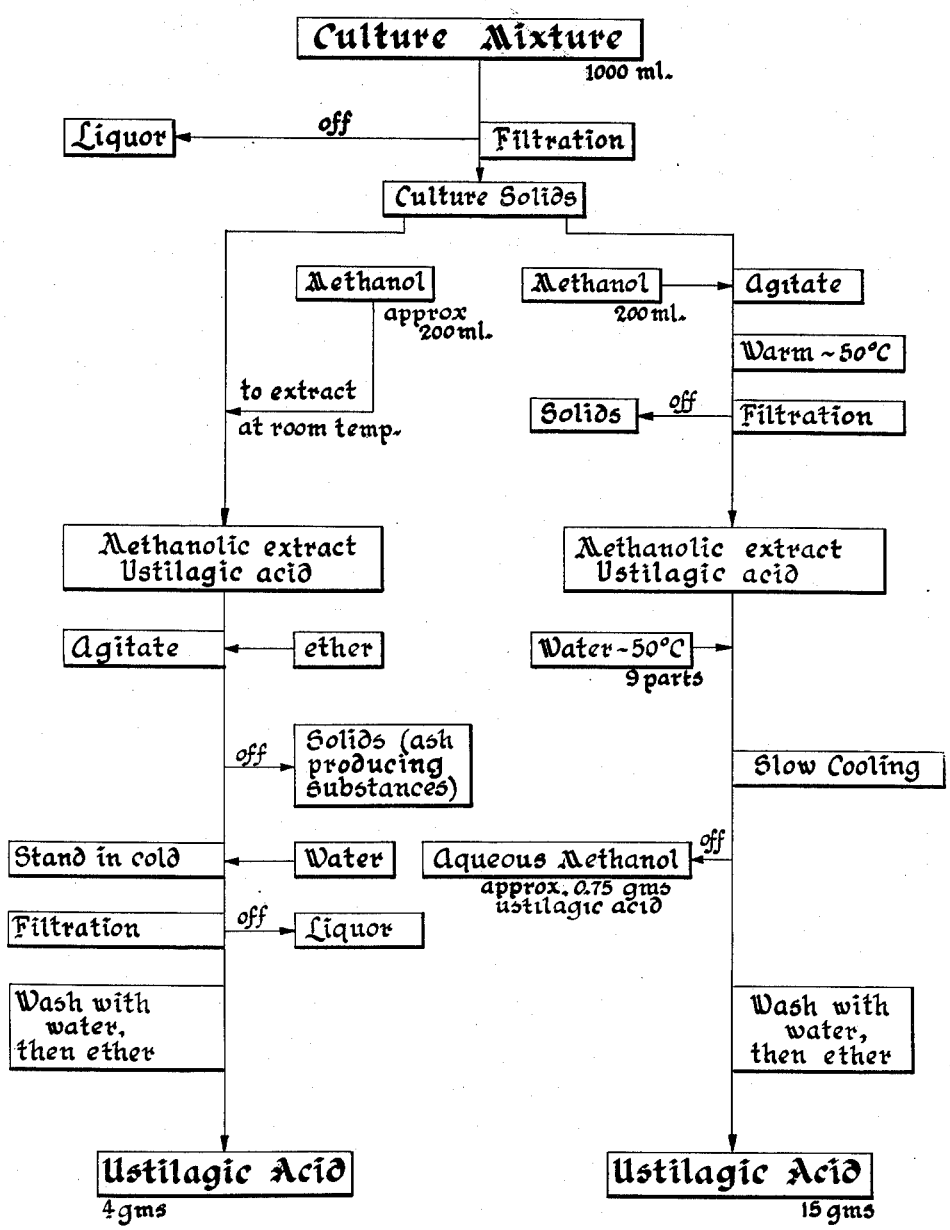

The method of recovering the product from the fermentation mixture is illustrated in the flow sheet shown in Figure 2 of the accompanying drawing and described in the following examples.

(1) The culture solids were separated by filtration from one litre of culture mixture produced as above. The filtered solids were pressed as dry as possible. The moist filter cake was extracted with approximately 200 ml. methanol to remove the crystalline material and the methanolic extract was filtered off. Twice the volume of ether was added to the methanolic extract and the mixture well mixed and then clarified to remove ash producing substances. Two volumes of water were added to the methanol-ether solution to form an ether phase and an aqueous methanol phase. The ustilagic acid precipitates in the aqueous methanol layer and partly in the ether layer. After several days standing at a preferred temperature of about 1° C. the precipitate is recovered by filtration and the recovered ustilagic acid is further purified by washing with water then ether. Yield of ustilagic acid was 4 gm.

(2) Culture solids were separated from one litre of culture broth, produced as described above, by filtration and dried on the filter funnel. The solids were blended with approximately 200 ml. methanol and the mixture warmed to approximately 50° C. for 20–30 minutes. While the mixture was still warm, the methanolic extract was separated from the solids which were extracted a second time to check the completeness of extraction of ustilagic acid. Nine parts of hot (50° C.) tap or preferably distilled water were added to the methanolic extract and the dilute aqueous methanol mixture allowed to cool slowly by leaving the mixture in a flask in a hot water bath until both the mixture and the bath had cooled to room temperature. After standing several days at room temperature, the crystalline ustilagic acid was recovered by filtration, washed with water, then with ether to remove fats and other ether soluble materials, and then dried. Yield of ustilagic acid was 15 grams. When extractions were carried out at room temperature yield of ustilagic acid was 7.7 grams.

This application is a continuation-in-part of Serial No. 194,391 filed November 6, 1950, now abandoned.

What is claimed is:

1. A new metabolic product comprising essentially ustilagic acid, being soluble in methanol, pyridine, 2,3-butanediol, 1,2-propanediol, and ethanol, sparingly soluble in blood serum, vegetable oils, butanol and acetone, substantially insoluble in water, glycerol, ethyl acetate, amyl acetate, diethyl ether, when substantially pure having a melting point of 146–147° C. and petroleum ether and when suspended in solid form in hydrocarbon oil exhibits in the infra red region of the spectrum characteristic absorption bands, expressed in microns of 2.98, 5.76, 8.04, 8.54, 8.88, 9.38, 9.68, 10.18, 10.72, 11.22 and 11.76.

2. A new metabolic product comprising essentially ustilagic acid, effective in inhibiting the growth of certain Gram-positive and Gram-negative bacteria, and of many fungi, forming salts with bases, consisting of the elements carbon, hydrogen and oxygen, being soluble in methanol, pyridine, 2,3-butanediol, 1,2-propanediol and ethanol, sparingly soluble in butanol, acetone, blood serum, vegetable oils and essentially insoluble in water, glycerol, ethyl acetate, amyl acetate, diethyl ether, benzene and petroleum ether, having when substantially pure a melting point of 146–147° C. and a specific rotation in pyridine of $[\alpha]_D^{23} + 7°$ and exhibiting characteristic absorption bands in the infra red region of the spectrum when suspended in a hydrocarbon oil in solid form at the following wave lengths expressed in microns: 2.98, 5.76, 8.04, 8.54, 8.88, 9.38, 9.68, 10.18, 10.72, 11.22, 11.76 and the basic salts of said substances.

3. A metabolic product ustilagic acid effective in inhibiting the growth of Gram-positive and Gram-negative bacteria and of fungi, which is capable of forming salts with bases, consisting of the elements carbon, hydrogen and oxygen, being soluble in methanol, pyridine, 2,3-butanediol, 1,2-propanediol and ethanol, sparingly soluble in butanol, acetone, blood serum, vegetable oils and essentially insoluble in water, glycerol, ethyl acetate, amyl acetate, diethyl ether, benzene and petroleum ether, having when substantially pure a melting point of 146–7° C. and a specific rotation in pyridine of $[\alpha]_D^{23} + 7°$ and exhibiting characteristic absorption bands in the infra red region of the spectrum when suspended in a hydrocarbon oil in solid form at the following wave lengths expressed in microns: 2.98, 5.76, 8.04, 8.54, 8.88, 9.38, 9.68, 10.18, 10.72, 11.22, 11.76.

4. A method of producing ustilagic acid which comprises the step of introducing a culture of *Ustilago zeae* into an aqueous nutrient liquor having a pH between 6 and 7 and containing fermentable carbonaceous and nitrogenous substances and mineral salts and fermenting said liquor aerobically until the pH of the liquor has dropped to below about 5 and separating solids from the aqueous culture mixture, treating the solids with methanol, filtering the mass and treating the filtrate with ether and water to precipitate which when suspended in solid form in hydrocarbon oil exhibits in the infra red region of the spectrum characteristic absorption bands, expressed in microns of, 2.98, 5.76, 8.04, 8.54, 8.88, 9.38, 9.68, 10.18, 10.72, 11.22 and 11.76.

5. The method defined in claim 4 wherein the precipitated ustilagic acid is treated at room temperature with methanol and ether, the solution is filtered to remove undissolved impurities, water is added, the solution is allowed to stand at a temperature of about 1° C. to effect precipitation, the mass is filtered to remove ustilagic acid and the latter is washed with water and ether.

6. The method defined in claim 4 wherein the precipitated ustilagic acid is treated with methanol at about 50° C., the mass is filtered to remove solids, water at about 50° C. is added to the filtrate, the mass is slowly cooled to precipitate ustilagic acid, the latter is removed and washed with water and ether.

References Cited in the file of this patent

UNITED STATES PATENTS

| | | |
|---|---|---|
| 536,346 | Hart | Mar. 26, 1895 |
| 2,482,055 | Duggar | Sept. 13, 1949 |

OTHER REFERENCES

Smith, Introduction to Industrial Mycology, 2 ed., 1942, pp. 166, 171 to 173. QK–603–S5.

Chemical Abstracts 40: 625 (3) Reflections on the growth-substance problem in microbiology. R. Thren. Kiikn Arch 60, 253–64 (1944).

Wolf et al., Fungi, vol. II, pp, 1–32, John Wiley & Sons, 1947, pp. 2, 3 and 10 relied upon. QK–603–W6.

Chemical Abstracts 43: 9239 f. Ustilagin of the corn smut (*Ustilago maydis*) I. Preliminary experiments with the active principles. L. Mazzanti Arch. Sci. Biol. (Italy) 33, 97–110 (1949).

Thorn et al., "Can. Journ. Botany," vol. 29, 1951, pages 403–10. Presented in part at A. C. S. meeting, Sept. 4, 1950. Manuscript received May 11, 1951.